United States Patent
Pastushenko

(10) Patent No.: US 11,435,517 B2
(45) Date of Patent: Sep. 6, 2022

(54) DISPLAY FOR AN INTERIOR OF A MOTOR VEHICLE

(71) Applicant: Dr. Ing. h.c. F. Porsche Aktiengesellschaft, Stuttgart (DE)

(72) Inventor: Alexandra Pastushenko, Esslingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 17/075,716

(22) Filed: Oct. 21, 2020

(65) Prior Publication Data

US 2021/0124104 A1    Apr. 29, 2021

(30) Foreign Application Priority Data

Oct. 28, 2019   (DE) ..................... 10 2019 129 001.5

(51) Int. Cl.
*F21V 8/00* (2006.01)
*G06F 3/041* (2006.01)
(Continued)

(52) U.S. Cl.
CPC .............. *G02B 6/006* (2013.01); *B60K 37/02* (2013.01); *B60R 13/02* (2013.01); *G02B 6/0055* (2013.01); *G06F 3/041* (2013.01); *B60K 2370/1438* (2019.05); *B60K 2370/1531* (2019.05); *B60K 2370/27* (2019.05); *B60K 2370/28* (2019.05);
(Continued)

(58) Field of Classification Search
CPC .... G02B 6/006; G02B 6/0055; G02B 6/0018; G02B 6/0036; G02B 6/0073; G06F 3/041; B60K 37/02; B60K 2370/27; B60K 2370/1438; B60K 2370/1531; B60K 2370/39; B60K 35/00; B60K 2370/33; B60K 2370/28; B60K 2370/336; B60K 2370/339; B60K 2370/34; B60K 2370/345; B60K 2370/682; B60K 2370/688; B60R 13/02; B60R 2013/0287; G09F 9/00; G09F 21/04; G09F 13/18; G02F 1/133616; B60Q 3/14; B60Q 3/54; B60Q 2500/10

See application file for complete search history.

(56) References Cited

U.S. PATENT DOCUMENTS 7,702,434 B2      4/2010  Dupont et al.
10,807,526 B2 *  10/2020  Persson ................ B60Q 3/217
(Continued)

FOREIGN PATENT DOCUMENTS

DE       102004038916 A1    3/2005
DE       102010053395 A1    6/2012
EP           2384903 A2    11/2011

*Primary Examiner* — Douglas M Wilson
(74) *Attorney, Agent, or Firm* — Leydig, Voit & Mayer, Ltd.

(57) ABSTRACT

A display for representing information in an interior of a motor vehicle includes a decoration component configured to be inserted in an interior trim of a motor vehicle. The decoration component has a display region configured to cover and/or represent an indication element and a decoration region for an optical design of the interior. The decoration region has a three-dimensional structure on a rear side that is remote from an upper side facing an interior. The display region is optically coupled to the decoration region for illuminating the three-dimensional structure.

14 Claims, 1 Drawing Sheet

(51) Int. Cl.
*B60K 37/02* (2006.01)
*B60R 13/02* (2006.01)
*B60Q 3/54* (2017.01)
*B60Q 3/14* (2017.01)

(52) U.S. Cl.
CPC .. *B60K 2370/336* (2019.05); *B60K 2370/339* (2019.05); *B60K 2370/34* (2019.05); *B60K 2370/345* (2019.05); *B60K 2370/39* (2019.05); *B60K 2370/682* (2019.05); *B60K 2370/688* (2019.05); *B60Q 3/14* (2017.02); *B60Q 3/54* (2017.02); *B60R 2013/0287* (2013.01)

(56) References Cited

U.S. PATENT DOCUMENTS

| | | | |
|---|---|---|---|
| 2019/0135199 A1* | 5/2019 | Galan Garcia | G06F 3/016 |
| 2020/0164795 A1* | 5/2020 | DeGrote | B60Q 3/64 |
| 2020/0207207 A1* | 7/2020 | Lesuffleur | G02B 1/14 |
| 2020/0262341 A1* | 8/2020 | Persson | B60Q 3/60 |

\* cited by examiner

DISPLAY FOR AN INTERIOR OF A MOTOR VEHICLE

CROSS REFERENCE TO RELATED APPLICATIONS

This application claims benefit to German Patent Application No. DE 10 2019 129 001.5, filed on Oct. 28, 2019, the entire disclosure of which is hereby incorporated by reference herein.

FIELD

The disclosure relates to a display for an interior of a motor vehicle, with the aid of which information can be represented in the interior space.

BACKGROUND

EP 2 384 903 A2 discloses a plastic component with a structured and partially coated rear side to make it possible to represent darker and brighter partial regions to a viewer.

SUMMARY

In an embodiment, the present invention provides a display for representing information in an interior of a motor vehicle. The display includes a decoration component configured to be inserted in an interior trim of a motor vehicle. The decoration component has a display region configured to cover and/or represent an indication element and a decoration region for an optical design of the interior. The decoration region has a three-dimensional structure on a rear side that is remote from an upper side facing an interior. The display region is optically coupled to the decoration region for illuminating the three-dimensional structure.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
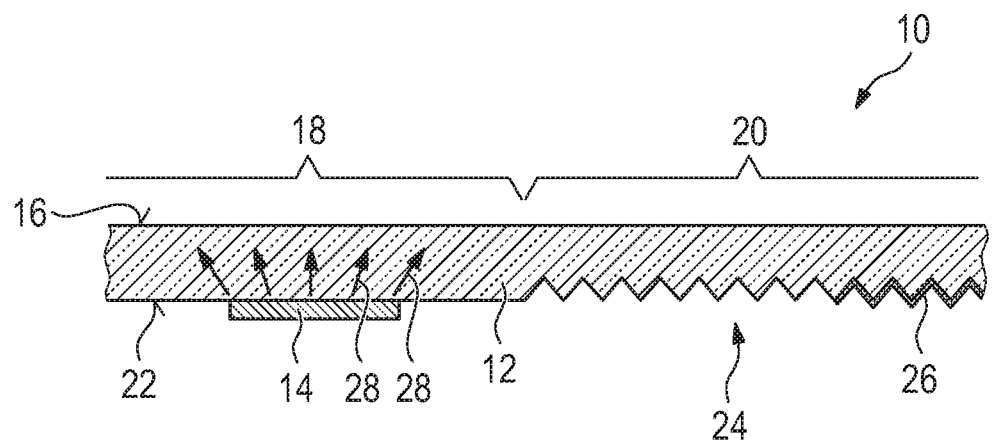
FIG. 1 shows a schematic sectional view of a display.

There is a continuing need to design an interior of a motor vehicle in a visually appealing manner.

The present disclosure describes measures which make a visually appealing design of an interior of a motor vehicle possible.

According to the disclosure, a display is provided for representing information in an interior of a motor vehicle, having a decoration component for insertion in an interior trim of a motor vehicle, wherein the decoration component has a display region for covering and/or representing an indication element and a decoration region for the optical design of the interior, wherein the decoration region has a three-dimensional structure on a rear side that is remote from an upper side facing the interior, and wherein the display region is optically coupled to the decoration region for illuminating the three-dimensional structure, is provided.

The at least one indication element can emit light and/or transmit light in order to represent information. The light beams of this light can enter the material of the display region and/or pass through the at least translucent, in particular substantially transparent, material of the display region. An occupant of the motor vehicle located in the interior can perceive the indication element and the represented information through the material of the display region. The indication element can, however, also emit light rays that do not pass through the upper side of the display region in the region of the indication element but travel to the decoration region of the decoration component inside the material of the display region. These light rays can be reflected completely or in part for example at a sufficient angle at the upper side and/or the lower side of the material of the decoration component in the display region and/or in the decoration region, with the result that at least a significant portion of the light rays produced are not emitted in the display region into the vehicle interior. The light rays of the display element that ultimately enter the material of the decoration region can be reflected and/or refracted at the three-dimensional structure on the rear side of the decoration region, with the result that at least the edges of the three-dimensional structure can visually stand out. The edges of the three-dimensional structure can form light refraction edges that are noticeable over the remaining material in the decoration region in particular due to brightness and/or color differences. The three-dimensional structure can be made to visually stand out for example in the manner of background lighting, with the result that a visually pleasing light-based representation is attained in the decoration region. In this respect, there is no need to provide illumination that is provided only for the decoration region. Rather, the illumination that is already provided for the display region and/or the light rays emitted by the indication element can be used to achieve the visually pleasing illumination of the three-dimensional structure. The three-dimensional structure in the decoration region can be illuminated and made to stand out by light rays coming from the display region, with the result that it is possible to design an interior of a motor vehicle in a cost-effective and visually appealing manner.

In a preferred embodiment, the indication element is designed to represent various colors. It is also possible to illuminate the decoration region in different colors using the colored light rays emitted differently depending on the current representation, wherein the color of the illumination of the decoration region corresponds to the color emitted by the indication element and underscores the representation in the display region in a visually appealing manner.

In particular, the three-dimensional structure has elevated portions, in particular ribs and/or pyramids, that protrude with respect to the surface normal of the upper side. The three-dimensional structure in particular has sharp edges, with the result that an optically sharp delineation of the illuminated three-dimensional structure is obtained and blur is avoided. The three-dimensional structure is in particular designed in the form of a repeating surface pattern, for example zigzag lines that protrude like ribs or diamonds that protrude in principle like pyramids. The protruding pyramid can have in particular a triangular or quadrangular, in particular square or diamond-type, base area. The three-dimensional structure can be formed for example in the manner of a bicycle reflector.

The display region preferably has a rear side, which is embodied to be substantially planar, and/or partial regions on the rear side that are embodied to be only substantially planar. Edges in the display region that are sharp and visibly stand out clearly can thereby be avoided. If the display region is designed to be entirely planar, the display region can cover the indication element. Alternatively, the display region can form a receiving pocket into which the indication element can at least partially be placed or embedded. The rear side of the display region can thus be designed in the region of the indication element in the form of a set-back portion that has an abrupt change in the material thickness at the periphery of the indication element. Since this abrupt change delimits the indication region of the indication element, light effects along said abrupt change are, however, not perceived as being potentially disturbing to the representation of the information by way of the indication element.

With particular preference, the three-dimensional structure is provided at least in a partial region, preferably over the entire rear side, with a reflective layer, in particular a reflective lacquer. A loss in luminosity due to light rays that exit and/or are absorbed at the rear side can thus be avoided. The decoration region can thus have a correspondingly large design without the visually appealing illumination of the three-dimensional structure being negatively affected thereby. In addition, it is possible to generate additional optical effects by way of a structured coating of only one partial region of the decoration region. For example, a loss in luminosity over an increasing distance of the illuminated three-dimensional structures from the light source of the indication element can be counteracted and at least partially compensated by a coating of the rear side of the decoration region that increases with respect to the surface area.

In particular, the display region and the decoration region are designed in one piece. A loss of luminosity owing to a material fracture between the display region and the decoration region can thus be avoided. Rather, good transmission of the light rays from the display region into the decoration region takes place.

The display region and/or the decoration region is preferably produced from an at least translucent, in particular substantially transparent, material, in particular glass or acrylic glass. The representation of the display element is substantially not negatively affected by a substantially transparent material in the display region. Owing to the transparent material, the edges of the three-dimensional structure may be easily visible in the decoration region. The decoration component is preferably designed to be translucent, for example colored, only in the decoration region so as to suitably create the optical impression in the decoration region.

With particular preference, the at least one indication element is embedded in the material of the display region, wherein the indication element is arranged in a shared material thickness region with the decoration region. The indication element can have, for example, LEDs that can emit light not only via their upper side but also via their lateral surfaces. The light exiting the indication element laterally can thereby be emitted directly into the decoration region and to the three-dimensional structure, so that a particularly low loss of luminosity can be expected.

In particular, at least one light element, in particular LED, is optically coupled to a side of the display region for laterally illuminating the decoration region. The light element can be provided for example for background illumination to support the representation of information by the indication element. The light rays generated here can additionally be coupled into the decoration region to illuminate the three-dimensional structure. The visually appealing representation in the decoration region is improved thereby.

The display region is preferably embodied in the form of a touch screen. The display region can have for example touch-sensitive surfaces so as to interact as an input medium with the indication element. For example, a specific media source, for example music, navigation system or the like, can be selected via the touch-sensitive display region. By the emission of light rays from the display region into the decoration region, optical feedback of the commands input by way of touch can be improved. Since a driver of the motor vehicle does not need to look precisely at the indication element but rather can also perceive the color design of the illuminated three-dimensional structure in the decoration region, a driver can more easily perceive command feedback from the corner of his or her eyes, without taking his or her gaze off the road, as a result of which driving safety is improved.

The disclosure further relates to an indication instrument for an interior of a motor vehicle having an indication element, connectible to an on-board computer of the motor vehicle, and a display, which may be embodied and developed as described above, for covering the indication element. The three-dimensional structure in the decoration region of the display can be illuminated and made to stand out by light rays coming from the display region, with the result that it is possible to design an interior of a motor vehicle in a cost-effective and visually appealing manner.

The display 10 illustrated in FIG. 1 can be installed in an indication instrument mounted in a dashboard of a motor vehicle to cover an indication element 14 that rests in particular against a decoration component 12 or can be embedded in the decoration component 12. The indication element 14 can have LEDs to represent information that can be viewed through an upper side 16 of the decoration component 12 that is embodied to be in particular substantially transparent. The decoration component 12 has a display region 18 and a decoration region 20 that adjoins the display region 18 in one piece. The display region 18 can be embodied in particular in the form of a touch screen for manipulating the indication of the indication element 14. The display region 18 has planar partial regions on the rear side 22 of the decoration component 12, while the decoration region 20 has on the rear side 22 a three-dimensional structure 24 that can be coated entirely or partially with a reflective lacquer 26.

Figure 2:
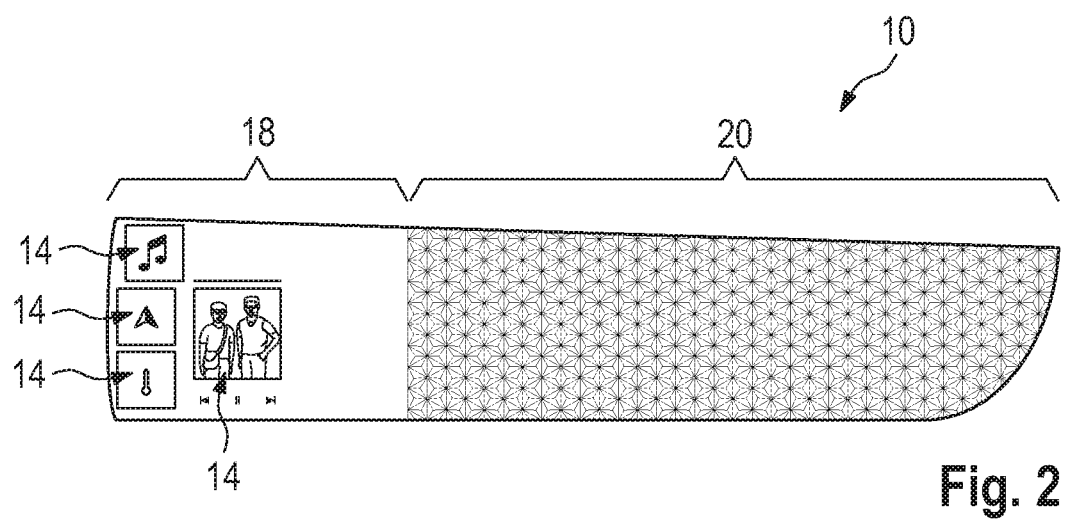
FIG. 2 shows a schematic plan view of the display from FIG. 1.

Light rays 28 coming from the indication element 14 can travel directly or indirectly via at least one reflection to the three-dimensional structure 24 and thereby make the three-dimensional structure 24 stand out visually, as illustrated in FIG. 2. The three-dimensional structure 24 is designed for example as a surface pattern having a multiplicity of substantially diamond-shaped pyramids. The decoration component 12 can be designed to be merely translucent by way of a coloration rather than to be entirely transparent for example in the decoration region 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A display for representing information in an interior of a motor vehicle, the display comprising:
    a decoration component configured to be inserted in an interior trim of a motor vehicle, the decoration component including a display region and a decoration region for an optical design of the interior, wherein the display region and the decoration region are formed in a single piece of glass or acrylic glass material, wherein the single piece of glass or acrylic glass material includes a first, transparent portion corresponding to the display region and a second, translucent portion corresponding to the decoration region, wherein a touch-sensitive surface is disposed in the first, transparent portion, the touch-sensitive surface being configured to display user interface widgets that include information and to receive user input, wherein a three-dimensional structure is formed on a rear side of the second, translucent portion, the rear side being opposite an upper side of the second, translucent portion that faces the interior of the motor vehicle, and
    a light-emitting element optically coupled to a side of the display region, the light-emitting element being configured to provide background illumination for the representation of the user interface widgets and to laterally illuminate the three-dimensional structure of the decoration region,
    wherein the light-emitting element is configured to emit, in response to the touch-sensitive surface receiving user input, light of a color corresponding to the received user input so as to illuminate the decoration region with the light of the color corresponding to the received user input, and
    wherein the rear side of the second, translucent portion is continuous with a rear side of the first, transparent portion and the front side of the second, translucent portion is continuous with a front side of the first, transparent portion.

2. The display as claimed in claim 1, wherein the three-dimensional structure covers the entire rear side of the second translucent portion, and
    wherein the three-dimensional structure has elevated portions that protrude with respect to a surface normal of the upper side of the second, translucent portion such that a thickness of the second, translucent portion varies over the plane that is perpendicular to the surface normal.

3. The display as claimed in claim 2, wherein the elevated portions are ribs and/or pyramids.

4. The display as claimed in claim 2, wherein a first region of the rear side of the second translucent portion is coated with a reflective material and a second region of the rear side of the second translucent portion is not coated with a reflective material, wherein the second region that is coated with the reflective material is separated from the first, transparent portion by the first region that is not coated with the reflective material.

5. The display as claimed in claim 1, wherein the entire rear side of the first transparent portion is planar,
    wherein the light emitting element is disposed on the planar rear side of the first transparent portion.

6. The display as claimed in claim 5, wherein at least one additional light-emitting element is optically coupled to the rear side of the display region and configured to laterally illuminate the three-dimensional structure of the decoration region.

7. The display as claimed in claim 1, wherein the three-dimensional structure is provided at least in a partial region with a reflective layer.

8. The display as claimed in claim 7, wherein the reflective layer is a reflective lacquer.

9. The display as claimed in claim 1, wherein at least one indication element is embedded in the first, transparent portion corresponding to the display region, wherein the indication element includes LEDs configured to emit light from an upper surface and from a lateral surface directly into the decoration region.

10. The display as claimed in claim 1, wherein the touch-sensitive surface disposed in the first, transparent portion forms a touch screen, wherein the touch screen is confined to the first, transparent portion.

11. An indication instrument for an interior of a motor vehicle, having an indication element, connectable to an on-board computer of the motor vehicle, and a display as claimed in claim 1 for covering the indication element.

12. The display as claimed in claim 1, wherein the decoration region is configured to reflect the light of the color corresponding to the received user input into the interior of the motor vehicle.

13. The display as claimed in claim 1, wherein the light-emitting element is configured to, prior to the receiving, by the touch-sensitive surface, the user input, emit light of a first color, and wherein the color corresponding to the received user input is different than the first color.

14. The display as claimed in claim 1, wherein the light-emitting element includes a plurality of light-emitting diodes (LEDs).

* * * * *